(12) United States Patent
Davenel et al.

(10) Patent No.: US 11,099,274 B2
(45) Date of Patent: Aug. 24, 2021

(54) TARGET TRACKING DEVICE COMPRISING A PHOTODETECTOR WITH QUADRANTS

(71) Applicant: SAFRAN ELECTRONICS & DEFENSE, Boulogne-Billancourt (FR)

(72) Inventors: Arnaud Davenel, Boulogne-Billancourt (FR); Romain Ferquel, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/648,617

(22) PCT Filed: Sep. 19, 2018

(86) PCT No.: PCT/EP2018/075367
§ 371 (c)(1),
(2) Date: Mar. 18, 2020

(87) PCT Pub. No.: WO2019/057783
PCT Pub. Date: Mar. 28, 2019

(65) Prior Publication Data
US 2020/0386891 A1    Dec. 10, 2020

(30) Foreign Application Priority Data

Sep. 19, 2017    (FR) ..................... 17/00947

(51) Int. Cl.
*G01B 11/26* (2006.01)
*G01S 17/66* (2006.01)
(Continued)

(52) U.S. Cl.
CPC ............. *G01S 17/66* (2013.01); *G01S 3/783* (2013.01); *G01S 17/88* (2013.01)

(58) Field of Classification Search
CPC .......... G01S 17/66; G01S 17/88; G01S 3/783
See application file for complete search history.

(56) References Cited

U.S. PATENT DOCUMENTS 3,954,340 A    5/1976  Blomqvist et al.
5,270,850 A *  12/1993 Mochizuki ........... G02B 26/125
                                                     359/206.1

(Continued)

OTHER PUBLICATIONS

International Preliminary Report on Patentability received for PCT Patent Application No. PCT/EP2018/075367, dated Apr. 2, 2020, 12 pages (6 pages of English Translation and 6 pages of Original Document).

(Continued)

*Primary Examiner* — Samantha K Nickerson
(74) *Attorney, Agent, or Firm* — Womble Bond Dickinson (US) LLP

(57) ABSTRACT

Device for tracking a target, the device comprising an optical system and a quadrant photodetector, wherein the optical system is configured to project a light beam coming from the target at one spot on at least one of the quadrants, and the photodetector is configured to estimate a current position of the spot by weighting of light energies received by the quadrants. The optical system comprises an optical device configured, when the spot is entirely contained in only one of the quadrants, to enlarge the spot. The invention also relates to a tracking method likely to be implemented by this tracking device.

13 Claims, 4 Drawing Sheets

(51) Int. Cl.
*G01S 3/783* (2006.01)
*G01S 17/88* (2006.01)

(56) References Cited

U.S. PATENT DOCUMENTS

| | | | | |
|---|---|---|---|---|
| 5,367,399 | A * | 11/1994 | Kramer | G02B 26/106 |
| | | | | 250/236 |
| 9,194,751 | B1 | 11/2015 | Yap et al. | |
| 2003/0076423 | A1* | 4/2003 | Dolgoff | H04N 13/305 |
| | | | | 348/222.1 |
| 2004/0227919 | A1* | 11/2004 | Shiraishi | 355/67 |
| 2013/0070239 | A1 | 3/2013 | Crawford et al. | |
| 2015/0168702 | A1* | 6/2015 | Harris | G01Q 60/18 |
| | | | | 850/30 |
| 2015/0289760 | A1* | 10/2015 | Zhou | G01J 9/00 |
| | | | | 351/205 |

OTHER PUBLICATIONS

International Search Report and Written Opinion received for PCT Patent Application No. PCT/EP2018/075367, dated Jan. 23, 2019, 14 pages (6 pages of English Translation and 8 pages of Original Document).

* cited by examiner

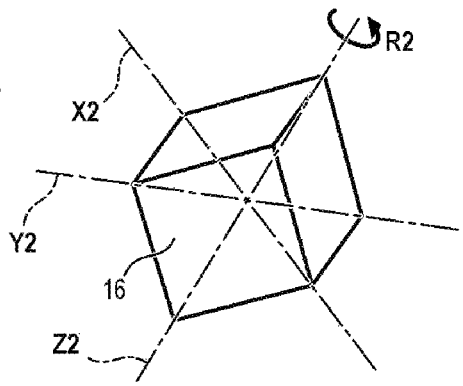
FIG. 4
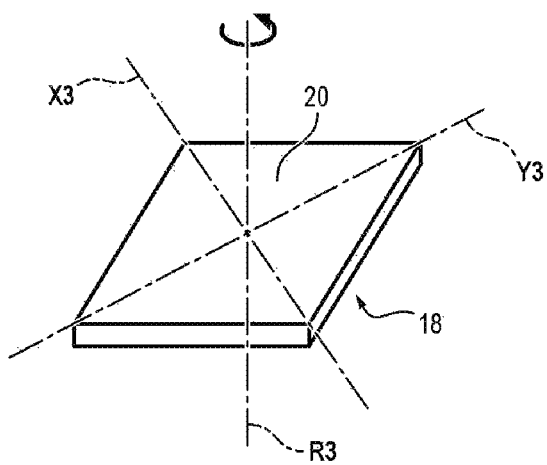
FIG. 5
FIG. 6
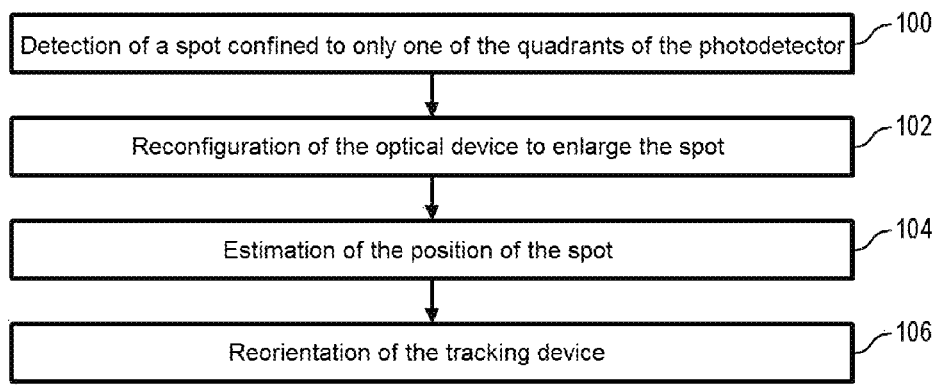

TARGET TRACKING DEVICE COMPRISING A PHOTODETECTOR WITH QUADRANTS

FIELD OF THE INVENTION

The present invention relates to a target tracking device using a quadrant photodetector.

STATE OF THE ART

In order to remotely track a target, it is known to illuminate the target with a laser beam, so that this beam is reflected on the target and that the laser echo resulting from this reflection is projected on a photodetector with four quadrants, more simply called "four-quadrant detector" or "4Q detector".

This type of detector is conventionally on board an aircraft such as a helicopter.

FIG. 1 illustrates four quadrants Q1 to Q4 of a conventional 4Q detector. The detector estimates a current position of a spot by weighting of light energies received by the quadrants Q1 to Q4, which extend around a center C. From this current position, it is possible to deduce how the target is oriented relative to the aircraft 1.

However, in some applications, in order to be able to achieve a very high angle error measurement accuracy (typically less than 500 microradians), the optronic assembly composed of the optical system and of the 4Q detector must be designed such that the laser echo is projected onto the quadrants at a very small spot T, to the point that the spot extends in only one of the quadrants of the 4Q detector (the quadrant Q4 in the example represented in FIG. 1). In such a situation, no weighting can take place since only one of the quadrants receives light energy. It is then known that the spot is generally located inside the sole quadrant that receives light energy, but the precise position of the spot in this quadrant cannot be accurately estimated.

For a weighting to be implemented again, a known solution is to move the spot T such that it simultaneously covers several quadrants of the 4Q detector. Such a displacement is typically obtained by reorienting the device comprising the optical system and the 4Q detector relative to the target.

However, it is not possible to know in advance the orientation command necessary so that, after application of the command, at least two of the four quadrants are lit. Consequently, the reorientation of the device comprising the optical system and the 4Q detector is manually controlled by a user.

Generally, such a manual command imparts a rotational movement to the device comprising the optical system and the 4Q detector such that the spot follows a spiral path towards the center of the 4Q detector, as represented in FIG. 1. This method is however long and tedious. In addition, this method depends on the user's dexterity and experience.

It has been proposed in document US 2013/0070239 and in document U.S. Pat. No. 3,954,340 to include in a target tracking device comprising a quadrant photodetector, an optical device configured to enlarge a spot entirely contained in only one of the quadrants of a 4Q photodetector. This optical device is in fact a defocuser that enlarges the spot by defocusing the light beam. The defocuser comprises a defocusing lens movable in translation relative to the 4Q photodetector.

Magnifying the projected spot has the effect of bringing the edge of the spot closer to a border between two quadrants.

If the approximation caused by the enlargement is such that the spot simultaneously covers at least two of the quadrants, then a weighting can be directly implemented, and the position of the spot can therefore be estimated. When this condition is not directly satisfied at the end of the enlargement step, a displacement of the spot must be implemented. Nevertheless, the displacement that must be implemented for the spot to simultaneously cover at least two of the quadrants becomes shorter after the enlargement step. The command that should be used to ensure this displacement of the spot is therefore much simpler after the enlargement. For example, if it is assumed that the spot can be incrementally displaced on the photodetector, the number of increments required for the spot to cross at least one border between two neighboring quadrants is reduced.

However, enlarging the spot by means of a defocuser has drawbacks.

A defocuser is very sensitive to vibrations and to temperature variations, which has harmful consequences on a possible harmonization between the tracking device used and an illuminator emitting the laser beam. The displacement of the defocusing lens is moreover energy-consuming and not easy to operate. Finally, a defocuser has a quality of transmission that can be improved.

DISCLOSURE OF THE INVENTION

An object of the invention is to be able to more quickly find the position of a spot projected on a quadrant detector, when this spot is confined to a single quadrant, by means of a device more robust to the vibrations or to the thermics, less electrical energy-consuming, easier to operate and having a higher quality of transmission.

There is therefore proposed, according to a first aspect of the invention, a device for tracking a target, the device comprising an optical system and a quadrant photodetector, wherein the optical system is configured to project a light beam coming from of the target at one spot on at least one of the quadrants, wherein the photodetector is configured to estimate a current position of the spot by weighting of light energies received by the quadrants, and wherein the optical system comprises an optical device configured, when the spot is entirely contained in only one of the quadrants, to enlarge the spot. The optical device comprises a polyhedron intended to be crossed by the light beam and having several optical axes, the polyhedron being movable in rotation relative to the photodetector about an axis of rotation different from each of the optical axes.

The polyhedron used is more robust to the vibrations and to the thermics than a defocusing lens, and has a better quality of transmissions.

The tracking device according to the first aspect of the invention may further comprise the following optional characteristics, taken alone or in combination.

The spot can be enlarged until the spot simultaneously covers at least two of the quadrants. Thus, it is not necessary to generate a command to displace the enlarged spot so that the position of this spot can be estimated by weighting of light energies received by the quadrants.

Furthermore, the spot can be enlarged until the spot has a predetermined diameter greater than or equal to the length of one side of a quadrant. In this case, the enlarged spot may not immediately cover several quadrants. A command to displace the spot adapted to satisfy this condition is nevertheless singularly simplified by the fact of having enlarged the spot to such a diameter.

The polyhedron can be a hexahedron, for example a cube, with three optical axes comprising respectively three diagonals of the hexahedron, the axis of rotation comprising another diagonal of the hexahedron. As a variant, the polyhedron may have two optical axes and comprise a face in the shape of a quadrilateral, for example a square, intended to be crossed by the light beam, the two optical axes comprising respectively two diagonals of the face and the axis of rotation being perpendicular to the face.

The tracking device can moreover comprise a multi-stable actuator configured to place the polyhedron in different angular positions, in which the projected spot has different sizes.

In addition, the following characteristics can be provided:
the photodetector has a center with a predetermined central position,
the quadrants are arranged around the center,
the target tracking device is designed to be movably mounted on an aircraft,
the target tracking device comprises a controller configured to generate, from the estimated current position and from the predetermined central position, at least one command to reorient the tracking device relative to the aircraft, the command being adapted so that the spot moves towards the photodetector center along a substantially rectilinear path.

According to a second aspect of the invention, there is proposed an aircraft comprising a target tracking device according to the first aspect of the invention.

According to a third aspect of the invention, there is proposed a target tracking method implemented by a device comprising an optical system configured to project a light beam coming from the target at one spot on at least one quadrant of a quadrant photodetector configured to estimate a current position of the spot by weighting of light energies received by the quadrants covered by the spot, the method comprising, when the spot is entirely contained in only one of the quadrants, an enlargement of the spot by an optical device of the optical system.

DESCRIPTION OF THE FIGURES

Other characteristics, objects and advantages of the invention will emerge from the following description which is purely illustrative and not limiting and which should be read in relation to the appended drawings wherein:

FIG. 4 is a perspective view of an optical device according to a first embodiment of the invention, FIG. 5 is a perspective view of an optical device according to a second embodiment of the invention, FIG. 6 is a flowchart of steps of a target tracking method according to one embodiment of the invention, FIGS. 7 and 8 each schematically illustrate a four-quadrant photodetector and two spots projected on this photodetector during the implementation of the tracking method according to FIG. 6.

In all of the figures, the similar elements bear identical references.

DETAILED DESCRIPTION OF THE INVENTION

Figure 2:
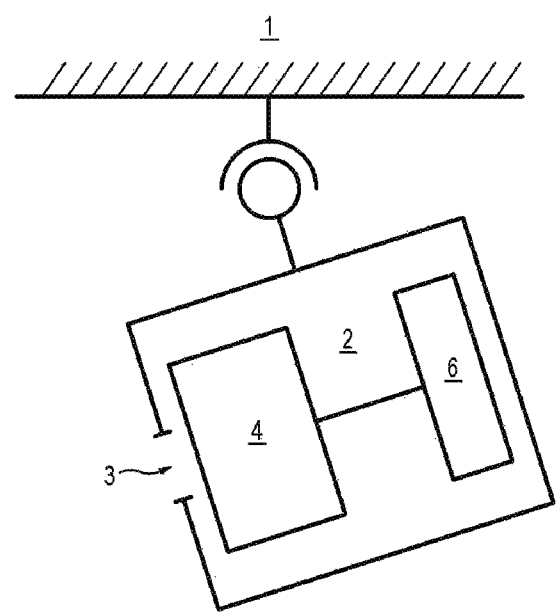
FIGS. 2 and 3 schematically illustrate a target tracking device according to one embodiment of the invention.

With reference to FIG. 2, an aircraft 1 comprises a target tracking device 2.

The tracking device 2 is mounted in rotation on the aircraft 1, for example by means of a ball joint or a pivot link.

The tracking device 2 comprises inner means for rotating the tracking device 2 relative to the aircraft 1. These inner means typically comprise at least one motor and one module for controlling the or each motor. Each motor allows rotating the device 2 about an axis associated with this motor. Consequently, when the inner means comprise several motors, the tracking device can be rotated about two different axes.

Furthermore, the target tracking device 2 comprises a lens 3, an optical system 4 and a photodetector 6.

A light beam coming from a target to be tracked can enter the tracking device 2 by this lens 3.

Figure 3:
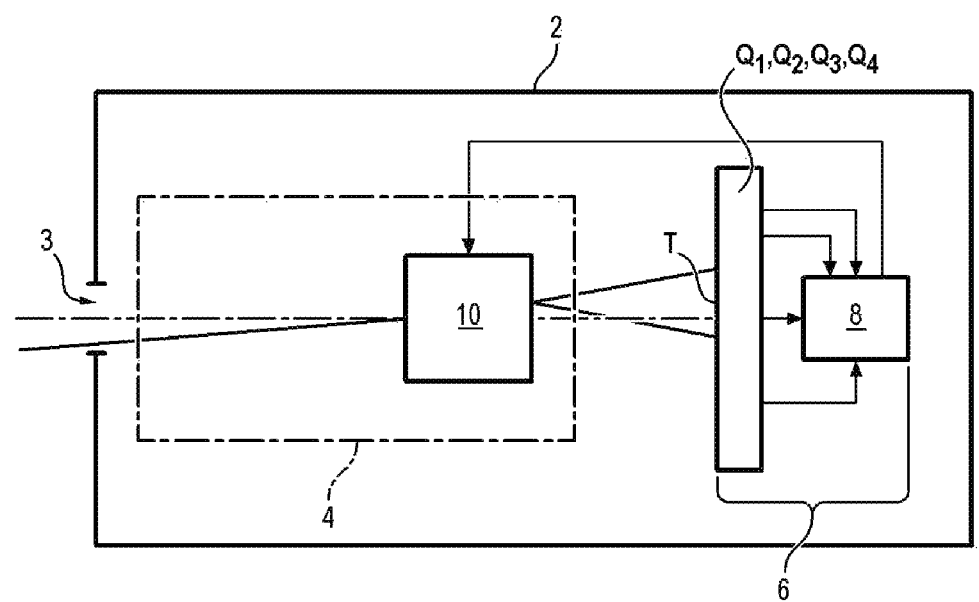

Referring to FIG. 3, the optical system 4 is configured to project a light beam received by the lens 3 on the photodetector 6 at one spot T.

Figure 1:
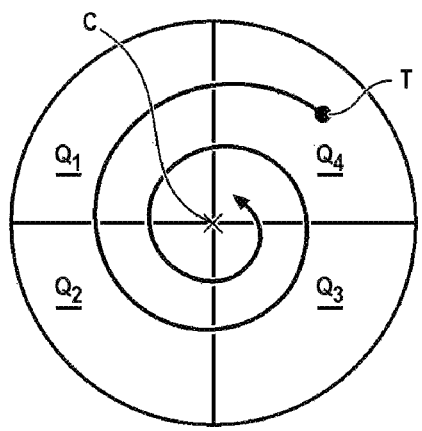
FIG. 1 schematically illustrates a four-quadrant photodetector on which a light beam is projected.

The photodetector 6, known per se, comprises four quadrants Q1, Q2, Q3 and Q4 like those schematically represented in FIG. 1. The four quadrants extend around a center C of the photodetector 6 whose position, called central position, is predetermined. Each quadrant Qi is adapted to generate an electrical signal as a function of the amount of light energy it receives per unit area.

The four quadrants can each have a quarter-circle shape, as in the example represented in FIG. 1. The assembly formed by the four quadrants is thus in the shape of a circle, and the center C is the center of this circle. In this case, the side of a quadrant is conventionally considered to be equal to the radius of this circle.

Alternatively, the four quadrants can each have a square shape. In this case, the assembly formed by the four quadrants is also squared, and the center C is located at the center of this square.

The photodetector 6 also comprises (or is coupled to) a weighter 8 configured to estimate a current position of the spot T by weighting of the electrical signals generated by the different quadrants Q1-Q4 according to a weighting method known from the state of the art.

The optical system 4 furthermore comprises an optical device 10 configured to modify a light beam coming from the lens 3 so as to be able to modify the size of the spot constituting the projection of the light beam on the photodetector 6.

The tracking device 1 further comprises a controller for generating and sending commands to the optical device 10, these commands being adapted to thereby modify the light beam. The controller is for example comprised in the weighter 8, or coupled thereto.

The optical device 10 comprises a translucent polyhedron intended to be crossed by a light beam received by the lens 3. The polyhedron has several optical axes, and is movable in rotation relative to the photodetector 6 about an axis different from each of its optical axes.

Such a polyhedron for modifying the beam has several advantages compared to a defocuser: it is more robust to the vibrations or to the thermics (sensitivity of the harmonization between the tracking device 1 and the illuminator), it is less electrical energy-consuming and it is easier to operate. In addition, the polyhedron has a better quality of transmission than a defocusing lens.

The tracking device 1 further comprises an actuator for rotating the polyhedron relative to the photodetector 6.

The actuator is configured to place the polyhedron in different angular positions, in which the spot projected on the photodetector 6 has different sizes.

The actuator is preferably multi-stable, which allows achieving additional energy savings.

The polyhedron can be available in several variants.

With reference to FIG. 4, an optical device 10 according to a first embodiment comprises a polyhedron 16 consistent with the above, having three optical axes X2, Y2, Z2. In this case, the polyhedron is a hexahedron: it can then be a cube, as represented in FIG. 5, or a parallelepiped.

The hexahedron has eight vertices, of which: two first opposite vertices passing through a first diagonal of the hexahedron, two second opposite vertices passing through a second diagonal of the hexahedron, two third opposite vertices passing through a third diagonal of the hexahedron, and two fourth opposite vertices passing through a fourth diagonal of the hexahedron.

The three optical axes X2, Y2, Z2 respectively comprise the first, second and third diagonals of the hexahedron.

The hexahedron is moreover movable in rotation relative to the photodetector 6 about an axis of rotation R comprising the fourth diagonal of the hexahedron.

An advantage provided by a hexahedron with three optical axes allows obtaining three different sizes of spots; this provides flexibility in the implementation of the method which will be described below.

Referring to FIG. 5, a second embodiment of the optical device 10 comprises a polyhedron 18 having only two optical axes X3, Y3.

The polyhedron has in particular a face 20 intended to be crossed by a light beam received by the lens 3. The face 20 is a quadrilateral, for example a square, which has four vertices, of which: two first opposite vertices passing through a first diagonal of the face, two second opposite vertices passing through the second diagonal of the face.

The two optical axes X3, Y3 of the polyhedron 18 respectively comprise the first and second diagonals of the face 20.

The polyhedron 18 is moreover movable in rotation relative to the photodetector 6 about an axis of rotation R3 orthogonal to the plane of the face 20. The axis of rotation R3 passes for example through the point of intersection of the diagonals of the face.

In this variant, the polyhedron typically has the shape of a thin plate measured perpendicularly to the face.

The polyhedron 18 is simpler in design and more compact than the polyhedron 16.

Referring to FIG. 6, a method implemented by means of the tracking device 2 comprises the following steps, for tracking a target.

It is assumed that the target T is illuminated by an illuminator, for example on board the aircraft 1. This illuminator is for example a laser.

A light beam generated by the illuminator is reflected on the target T, and enters the tracking device 1 through its lens 3.

The light beam received by the lens 3 is projected by the optical system 4 on the quadrant photodetector 6 at one spot T.

At this stage, the optical device 10 operates in a first mode of operation, in which the spot T formed by the projection of the light beam on the photodetector 6 is smaller than the side of a quadrant.

Of course, when the target moves relative to the tracking device 2, the spot moves on the photodetector 6 (the aircraft 1 is indeed movable, and the target can of course be movable too).

Figure 7:
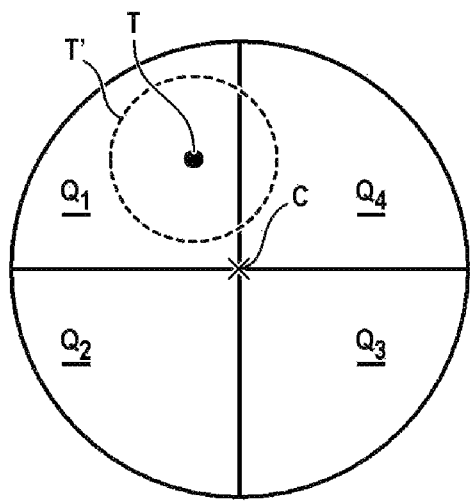

During a step 100, the photodetector 6 detects that the spot T is contained in only one of its quadrants, for example the quadrant Q1, as represented in FIG. 7. Such detection is typically carried out by the weighting unit, by comparing the intensity of the electrical signals generated by the different quadrants of the photodetector 6 at a predetermined threshold. Such a detection occurs more particularly by noting that the three electrical signals generated by three of the quadrants (here the quadrants Q2, Q3, Q4) have intensities below the predetermined threshold, meaning that these three quadrants have not received any substantial light energy, while the electrical signal generated by the quadrant Q1 has an intensity greater than the threshold, which means that the quadrant Q1 has, for its part, received light energy in substantial amounts.

When such detection 100 occurs, the photodetector 6 is not capable of accurately determining where the spot is located, and might in particular get outside the field of view of the lens 3 of the tracking device 2.

Also, when such detection 100 occurs, the optical device 10 is reconfigured (step 102) so as to enlarge the spot located at this stage only on the quadrant Q1, and this until the spot covers not only the quadrant Q1, but also at least one of the three quadrants Q2, Q3, Q4.

In the example represented in FIG. 5, the spot T becomes after enlargement a referenced spot T' covering at least partially the quadrants Q1 and Q4 simultaneously.

The reconfiguration 102 of the optical device 10 comprises for example generating, by the weighter, a command to reconfigure the optical device 10 and transmitting this command to the optical device 10 to cause the enlargement of the spot T in the spot T'.

The enlargement caused by the reconfiguration 102 is for example stopped as soon as the weighting unit detects that at least two of the four electrical signals it receives has an intensity greater than the predetermined threshold (either two electrical signals among the four signals, or three electrical signals among the four generated signals, or the four signals). This means indeed that the enlarged spot T' covers several quadrants simultaneously.

It is formally considered that the optical device 10 is in a second mode of operation once this condition is verified.

Furthermore, once this condition is verified, the weighting unit can weight the electrical signals it receives so as to estimate the current position of the center of the spot on the detector.

Then, the controller generates, from the estimated current position and from the predetermined central position, at least one command to reorient the tracking device 2 adapted so that the spot moves towards the photodetector center 6 along a substantially rectilinear path.

The generated command is transmitted to the motor(s), which causes a rotation of the tracking device 2 relative to the aircraft 1. During this rotation, the spot moves towards the photodetector center 6 along a substantially rectilinear path.

It can be provided that the enlargement step is carried out until the spot has a predetermined diameter. Indeed, enlarging the spot too much could lead to a loss of light energy (a large part of the light beam would be projected out of the photodetector 6). This predetermined diameter is preferably greater than or equal to the length of one side of a quadrant.

Of course, the enlarged spot, when the predetermined diameter has been reached, may indeed cover several quadrants of the photodetector 6 as previously assumed, thus making it possible to again implement a weighting of light energies received by the quadrants.

Figure 8:
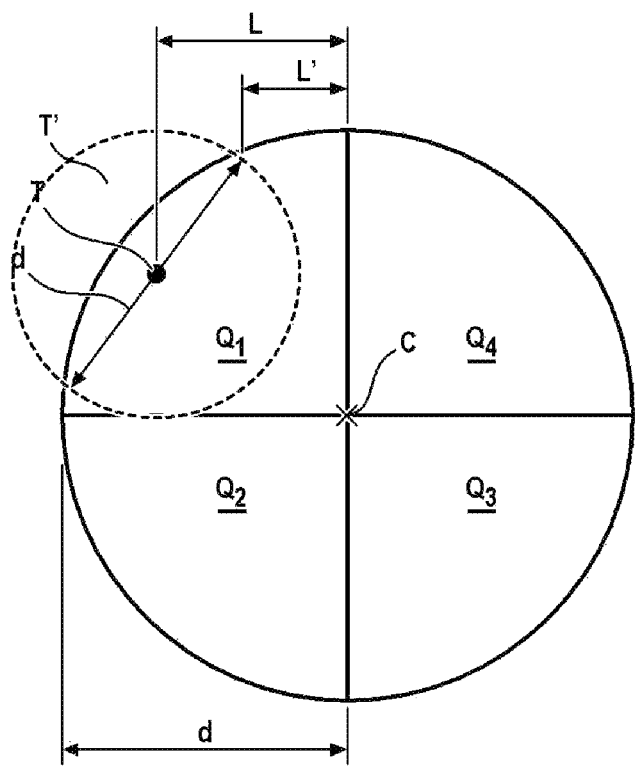

However, this condition may also not be satisfied when the predetermined diameter has been reached. Referring to FIG. 8, an example of a spot T located in quadrant Q1 is represented. The spot T is distant from the neighboring quadrant Q4 by a distance L. At the end of the enlargement step, the spot T has become the enlarged spot T' (represented in dotted lines) having a diameter equal to the length d of one side of a quadrant. Although the enlarged spot T' remains at a distance from the quadrants Q2, Q3 and Q4, the fact remains that this distance has been reduced by the enlargement. For example, the enlarged spot is distant from the quadrant Q4 by a distance L' smaller than the distance L.

When it is detected that only one quadrant receives light energy from the beam even after enlargement (Q1 in the example in FIG. 8), a displacement of the spot towards the opposite quadrant is controlled. As the distance L' is smaller than the distance L, the command to be used remains simpler than the command that should have been used without the enlargement step.

Ultimately, two events can trigger the end of the enlargement step: covering the spot on several quadrants, or achieving a spot diameter of predetermined value (greater than or equal to the length of one side of a quadrant).

The invention claimed is:

1. A device for tracking a target, the device comprising an optical system and a quadrant photodetector, wherein:
   the optical system is configured to project a light beam coming from the target at one spot on at least one of the quadrants,
   the photodetector is configured to estimate a current position of the spot by weighting of light energies received by the quadrants,
   the optical system comprises an optical device configured, when the spot is entirely contained in only one of the quadrants, to enlarge the spot,
   wherein the optical device comprises a hexahedron arranged to be crossed by the light beam and having three optical axes comprising respectively three diagonals of the hexahedron, the hexahedron being movable in rotation relative to the photodetector about an axis of rotation comprising another diagonal of the hexahedron.

2. The target tracking device according to claim 1, wherein the spot is enlarged until the spot simultaneously covers at least two of the quadrants.

3. The target tracking device according to claim 1, wherein the spot is enlarged until the spot has a predetermined diameter greater than or equal to the length of one side of a quadrant.

4. The target tracking device according to claim 1, wherein the hexahedron is a cube.

5. The target tracking device according to claim 1, wherein:
   the photodetector has a center having a predetermined central position,
   the quadrants are arranged around the center,
   the target tracking device is configured to be movably mounted on an aircraft,
   The target tracking device comprises a controller configured to generate, from the estimated current position and from the predetermined central position, at least one command to reorient the tracking device relative to the aircraft, the command being adapted so that the spot moves towards the photodetector center along a substantially rectilinear path.

6. The target tracking device according to claim 1, further comprising a multi-stable actuator configured to place the polyhedron in different angular positions in which the projected spot has different sizes.

7. An aircraft comprising a target tracking device according to claim 1.

8. A device for tracking a target, the device comprising an optical system and a photodetector comprising quadrants, wherein:
   the optical system is configured to project a light beam coming from the target at one spot on at least one of the quadrants,
   the photodetector is configured to estimate a current position of the spot by weighting of light energies received by the quadrants,
   the optical system comprises an optical device configured, when the spot is entirely contained in only one of the quadrants, to enlarge the spot,
   wherein the optical device comprises a polyhedron comprising a quadrilateral face arranged to be crossed by the light beam and having two optical axes, the two optical axes comprising respectively two diagonals of the quadrilateral face, the polyhedron being movable in rotation relative to the photodetector about an axis of rotation perpendicular to the quadrilateral face.

9. The target tracking device according to claim 8, wherein the quadrilateral face is a square.

10. A target tracking method implemented by a device comprising an optical system configured to project a light beam coming from the target at one spot on at least one quadrant of a quadrant photodetector configured to estimate a current position of the spot by weighting of light energies received by the quadrants, the method being characterized in that it comprises, when the spot is entirely contained in only one of the quadrants, enlarging the spot by an optical device of the optical system, the method being characterized in that the optical device comprises a polyhedron arranged to be crossed by the light beam and having optical axes, the polyhedron being movable in rotation relative to the photodetector about an axis of rotation different from each of the optical axes, wherein the polyhedron is a hexahedron having three optical axes comprising respectively three diagonals of the hexahedron, the axis of rotation comprising another diagonal of the hexahedron.

11. The method according to claim 10, wherein the polyhedron is a cube.

12. A target tracking method implemented by a device comprising an optical system configured to project a light beam coming from the target at one spot on at least one quadrant of a quadrant photodetector configured to estimate a current position of the spot by weighting of light energies received by the quadrants, wherein the method comprises, when the spot is entirely contained in only one of the quadrants, enlarging the spot by an optical device of the optical system, wherein the optical device comprises a polyhedron arranged to be crossed by the light beam and having optical axes, the polyhedron being movable in rotation relative to the photodetector about an axis of rotation different from each of the optical axes, wherein the polyhedron has two optical axes and comprises a quadrilateral face arranged to be crossed by the light beam, the two optical axes comprising respectively two diagonals of the quadrilateral face and the axis of rotation being perpendicular to the quadrilateral face.

13. The method according to claim 12, wherein the quadrilateral face is a square.

* * * * *